Feb. 12, 1929.

A. L. CHEVALLIER ET AL 1,702,153

SPORTING GUN, RIFLE, AND THE LIKE

Filed June 2, 1927    3 Sheets-Sheet 1

WITNESSES
Edw. Thorpe
S.W. Foster

INVENTORS
A. L. Chevallier
Robert Churchill
BY
ATTORNEYS

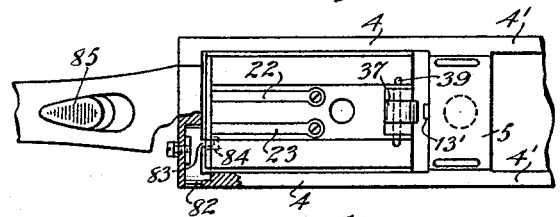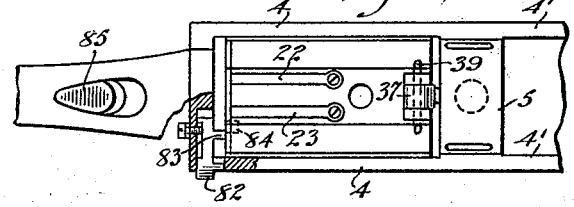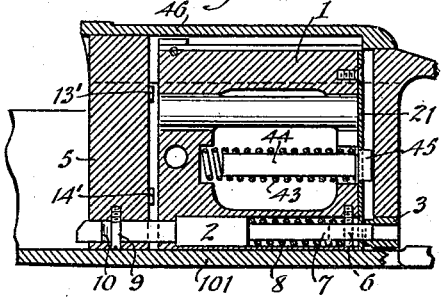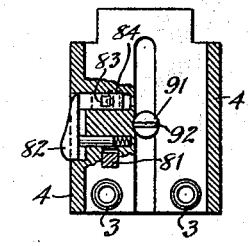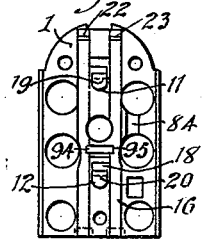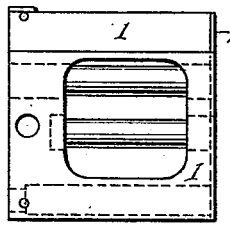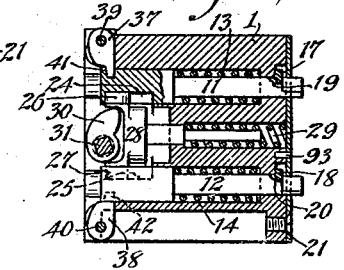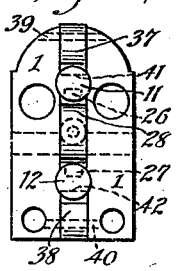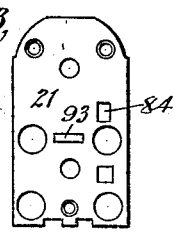

Feb. 12, 1929.
A. L. CHEVALLIER ET AL
1,702,153
SPORTING GUN, RIFLE, AND THE LIKE
Filed June 2, 1927    3 Sheets-Sheet 3
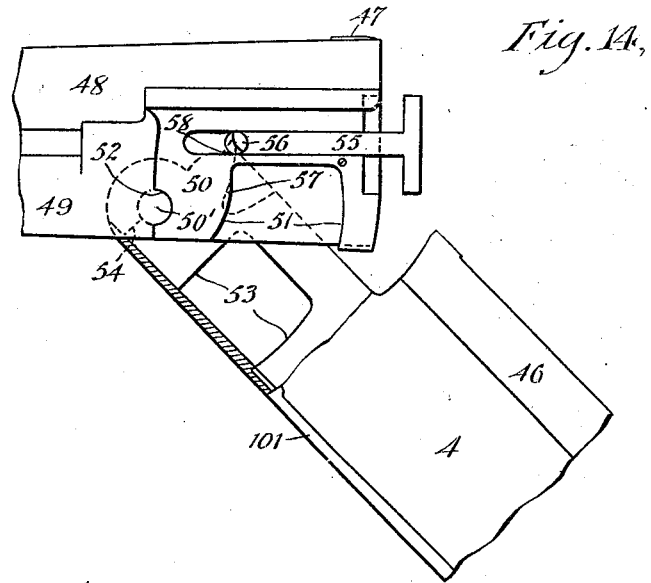
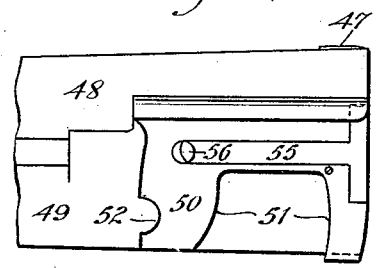
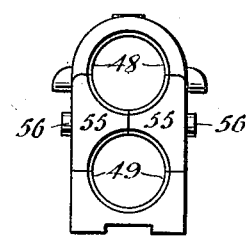
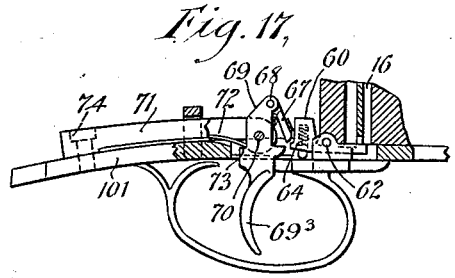
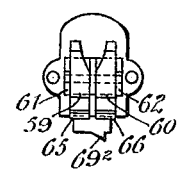
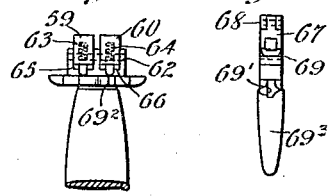
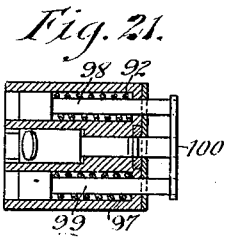
WITNESSES
Edw. Thorpe
INVENTORS
A. L. Chevallier
Robert Churchill
BY
ATTORNEYS Patented Feb. 12, 1929.

1,702,153

UNITED STATES PATENT OFFICE.

ARNOLD LOUIS CHEVALLIER, OF FOURMARKS, HAMPSHIRE, AND ROBERT CHURCHILL, OF LONDON, ENGLAND.

SPORTING GUN, RIFLE, AND THE LIKE.

Application filed June 2, 1927, Serial No. 196,080, and in Great Britain June 30, 1926.

This invention relates to improvements in guns and more particularly to shotguns although of course the invention may apply to other types of guns.

One object of our invention is to provide an improved double barrel gun of the under-and-over type.

According to one feature of this invention, as applied to a double barrel gun of this type, we provide an inertia weight which carries the percussion pins, sears therefor, locking bolts and accumulator springs, the arrangement being such that relative movement between the said pins and the inertia weight due to the recoil of the gun, automatically effects the cocking of the said pins.

Preferably the arrangement is such that the peak of the recoil is reduced by the action of the inertia weight.

In one form of construction we provide an inertia weight slidably mounted in a recess in rear of the action body. The weight when under recoil floats between springs, those at the rear of the inertia weight extending during recoil and acting as buffer springs, whilst those acting on the front function as accumulator springs. The forward end of the accumulator springs bear against the locking bolts which lock the barrels in positioin on the action body, so that these barrels remain closed so long as any recoil obtains.

The inertia weight is recessed or bored to receive the accumulator springs and the locking bolts and also carries the secondary sears and the percussion pins, which, when the trigger is released, impart a blow to firing pins.

The secondary sears are arranged vertically and are slidably mounted at the rear of the inertia weight, and are at right angles to the percussion pins, the said sears being located by a plate secured to the inertia weight. The secondary sears are each normally retained in the cocked position by a spring housed on top of the weight whilst the lower ends of the secondary sears are in contact with one end of the primary sears, the other ends of which are engaged by a beak or rocking finger on the trigger, which latter is capable of rocking against the action of a spring. This spring may conveniently be of flat section and we provide, preferably at or about the middle of the spring screw actuated means by which the effective length of the spring and consequently its resistance to bending can be varied, this forming a ready means by which the " pull " on the trigger can readily be adjusted.

According to a further feature of our invention which is not confined to double barrel guns of the under-and-over type, we provide the inertia weight with locking means (additional to the normal locking means) for locking the barrel or barrels of the gun, the arrangement being such that on recoil the said locking means is moved into effective locking position by the relative movement between the gun and the inertia weight. This may be effected by detachably securing to the inertia weight a cover plate which normally overlaps the barrel, this latter being preferably slightly coned or bevelled so that when the gun recoils, the cover further overlaps and comes into effective engagement with the inner end of the barrel and prevents upward movement thereof.

A further feature of our invention relates to means whereby the cost of manufacture of a drop-down gun can be reduced.

According to this feature of our invention the breech end of the barrel or barrels is guided when moved into position from the drop-down position by plates forming abutments for the lateral locking lugs and detachably secured to the action body. These plates (since they are detachable) can readily, and therefore more cheaply, be more accurately shaped than is the case where the guiding surfaces are integral with the action body.

In order to " break " the gun, we provide a lever having a projection which is adapted to bear against a lug secured to the action body. The said lever is mounted on the inertia weight and must therefore partake of the to and fro movement due to recoil.

When it is desired to break the gun, the lever is rocked about the lug so that the inertia weight is slidden, thus moving the cover plate and locking bolts out of engagement with the barrel.

The invention is illustrated in the accompanying drawings, in which Figure 1 is a sectional elevation looking from the right hand side of the action body;

Figures 5 and 6 are plan views showing the inertia weight in alternative positions;

Figure 7 is a detail sectional elevation showing the mounting of the inertia weight in the action body;

Figure 8 is a transverse section showing one end of the action body and the safety catch;

Figure 9 is a rear end elevation of the inertia weight showing the secondary sears;

Figure 10 is a side elevation thereof;

Figure 11 is a longitudinal section of Figure 10;

Figure 12 is a front end elevation showing the percussion pins on the inertia weight;

Figure 13 is a detail view of a plate for securing the secondary sears in position;

Figure 14 is a detail elevation showing the breaking of the gun and the ejector mechanism;

Figure 15 is a detail elevation of the rear end of the barrel showing the means for the attachment thereof to the action body;

Figure 16 is a rear elevation of Figure 14;

Figure 17 is a detail sectional elevation of the trigger mechanism;

Figure 18 is a plan view of the primary sears;

Figure 19 is an elevation of Figure 18;

Figure 20 is an end elevation of the trigger;

Figure 21 is a section of a modification.

Figure 1:
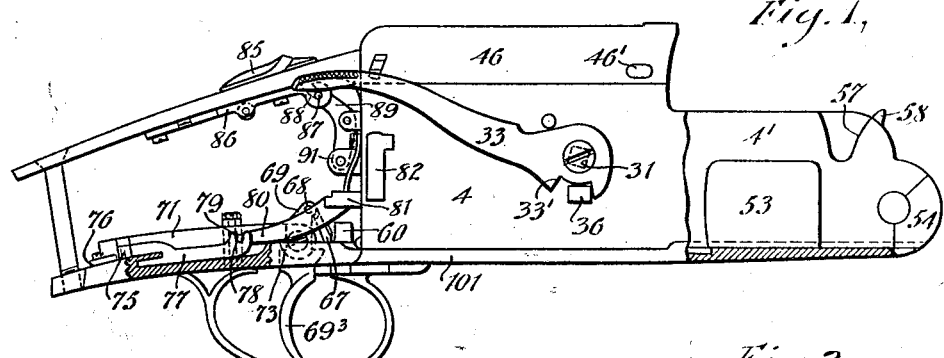

1 is an inertia weight which is slidably suspended upon locking bolts 2, slidably mounted at one end in bushes 3 secured to an action body 4, and at the other end are slidably mounted in a standing breech 5, also secured to the action body 4, as shown in Figure 7. 6 are screws secured to the weight 1 and passing through slots 7 formed in the locking bolts. Between the shoulders on the locking bolts 2 and the grub screws 6 are interposed accumulator springs 8, and 9 are screws screwed into the breech 5 and passing into grooves 10 formed in the bolts 2. 11 and 12 are percussion pins slidably mounted in the weight 1, and 13, 14 are springs which are interposed between shoulders on the pins 11, 12 and the weight, and are adapted to move the percussion pins against firing pins 13′, 14′. The pins 11, 12 are normally retained in the cocked position shown in Figures 7 and 11 by secondary sears 15, 16, lateral projections 17, 18 on which engage one end of grooves 19, 20, formed on the pins 11, 12, the sears being positioned by an end plate 21. 22, 23 are blade springs secured to the inertia weight and adapted to retain the sears in the cocking position. The forward ends of the pins 11, 12 are grooved at 24, 25 to receive projections 26, 27 formed on a yoke member 28, slidably mounted in the inertia weight and adapted to be moved forwardly by a spring 29. 30 is a cam which is adapted to engage the yoke member 28 and is fast with a spindle 31 rotatably mounted in the inertia weight, the spindle passing through slots 32 formed in the side walls of the action body. Secured to one end of the spindle 31 is a hand lever 33, provided with a projection 33′, and at the other end of the spindle is secured a member 34 formed with a projection 35, the projections 33′ and 35 being adapted to engage abutments 36 formed on the action body. 37, 38 are segments pivoted at 39, 40 to the inertia weight, and provided with projections 41, 42 which enter grooves formed in the forward ends of the percussion pins 11, 12. The segments 37, 38 are adapted at a point midway between their pivotal axes, and the projections 41, 42, to engage the rear wall of the standing breech 5. 43 are buffer springs interposed between the weight 1 and shoulders formed on pins 44, the heads 45 of which are adapted to engage the rear wall of the action body.

46 is a cover plate which is secured to the inertia weight by a cross bolt 46′ which passes through a slot in the standing breech 5 and a screw 46². The cover plate is bevelled at its forward end to engage a correspondingly bevelled lug 47 integral with barrels 48, 49 of the over-and-under type. The barrel body is provided with lugs 50 cut away as shown at 51, 52, to embrace projections 53, 54, respectively formed on the forwardly extending side plates 4′ of the action body. The lugs 53 may, if desired, be formed of blocks detachably secured to the side walls 4′ of the action body. 55 are ejectors provided with pins 56 adapted to engage cam shaped recesses 57 formed in the side plates 4′ and projections 58 integral with the plate 4′.

The secondary sears 15, 16 are operable by primary sears 59, 60 which are pivoted at 61, 62 and are provided with springs 63, 64 adapted to rock the sears 59, 60 in a clockwise direction (see Figure 17). On the sears 59, 60 are projections 65, 66 adapted to be engaged by a trigger-beak 67 pivoted at 68 to a trigger blade 69 of a trigger 69³ pivoted at 70 to a rocking beam 71, a blade spring 72 being engaged by a shoulder 73 formed on the trigger 69. The trigger 69³ is formed with a recess 69' adapted to be engaged by a locking projection 69² when the trigger is in the set position. The rocking beam 71 is pivoted at 74 and is provided with a projecting member 75 engaged by a spring 76 and adapted to be engaged by a slidable member 77, the forward end of which is slotted at 78.

79 is a pin in engagement with the slot 78 and carried by an arm 80 integral with a bar 81 slidably mounted in the rear wall of the action body, and extending into a recess formed in the rear of the interia weight 1.

Figure 4:
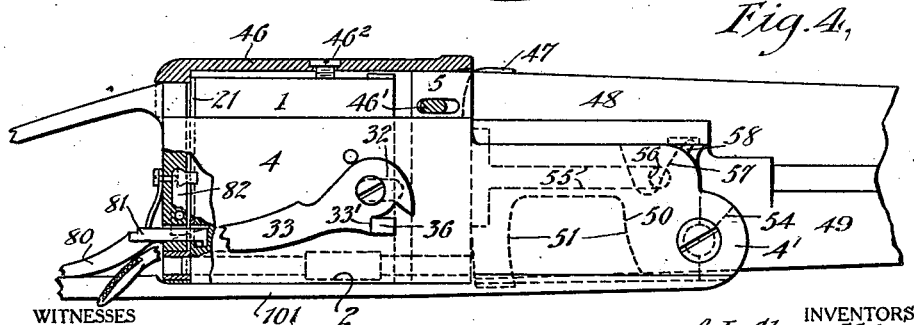
Figure 4 is a sectional elevation of the action body and barrels.

82 is a safety catch which is adapted to be engaged by the lever 33, the catch being slidably mounted in the action body and provided with a projection 83 adapted normally to abut against the rear of the interia weight in order to limit its rearward displacement when under recoil (see Figure 6) but to be moved when the lever 33 is rocked in an anti-clockwise direction into the position in Figures 4 and 5, in which position it is in register with a recess 84 formed in the interia weight, so as to enable the breech to be opened.

85 is a thumb piece secured to a sliding bar 86, a pin 87 on which is in engagement with a slot 88 formed in a lever 89 which is pivoted at 90 and is pivotally connected to a bolt 91 provided with a rectangular projection 92, adapted when the thumb piece 85 is moved rearwardly (i. e. to the safety position) to pass through a slot 93 in the end plate 21, and to engage grooves 94, 95 formed in the secondary sears 15, 16.

The trigger 69, rocking beam 71, primary sears 59, 60, and parts associated therewith are mounted upon a plate 101, which is detachably secured to action body 4; by this means the plate 101 and the parts carried thereby may readily be removed from the action body, and substituted by a similar unit.

Figure 2:
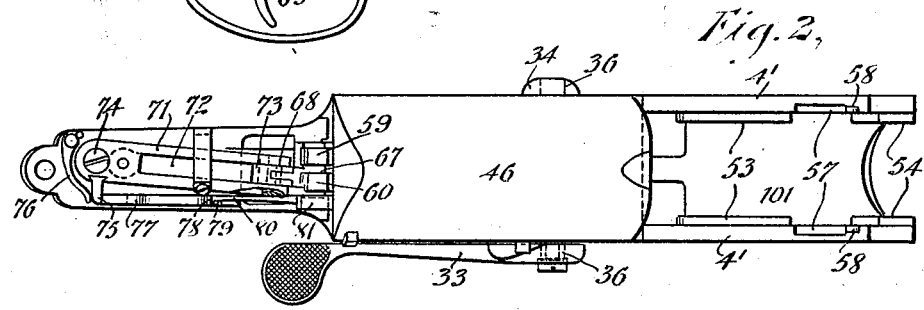
Figure 2 is a plan thereof, certain of the parts being removed.
Figure 3:
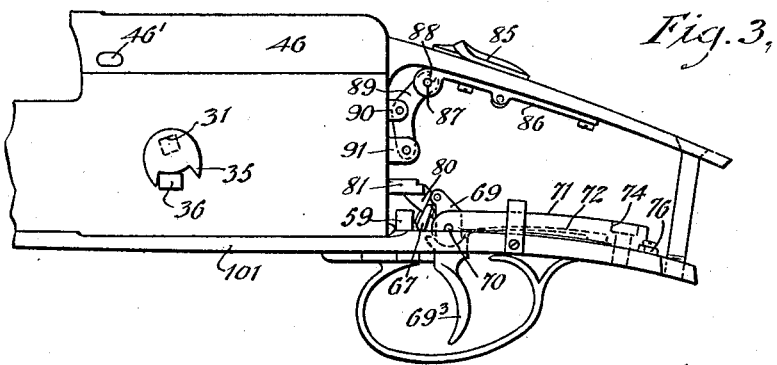
Figure 3 is an elevation looking from the left hand side of the action body.

In operation, assuming the trigger 69³ to be in the set position shown in Figure 2, the recess 69' is engaged by the projection 69² the trigger being thereby held in the set position. In this position the spring urged beak 67 is above the projection 66 formed on the primary sear 60. When the trigger is rocked in a clockwise direction (see Figure 17) the primary sear 60 is rocked in an anticlockwise direction and the secondary sear 16 is raised against the action of the spring 23. The projection 18 on the sear is thereby moved clear of the recess 20 formed in the percussion pin 12, which is thereby allowed to be forced by the spring 14 against the firing pin 14'. Due to the firing of the cartridge, the action body recoils and the inertia weight 1 remains stationary. During the recoil of the action body, the percussion pin 12 (which has been released) is moved rearwardly by the standing breech 5, until the breech engages the segment 38: completion of the recoil of the action body then rocks the segment about its pivot 40 whereby the projection 42 on the segment completes the movement of the percussion pin into the position shown in Figure 11, in which position the secondary sear 16 is pressed by the spring 23 into cocking engagement with the pin 12. It will be seen that the segment 38 moves the percussion pin 12 approximately twice the distance that the action body moves relatively to the inertia weight, the parts being so arranged that the percussion pin is moved so as not to project beyond the face of the inertia weight. The percussion pin 11, when it is freed from its sear to fire the second cartridge, is similarly moved due to the recoil, by its segment 37, and thus it will be seen that percussion pins 11, 12 are automatically cocked by the recoil, and when in their cocked positions, the percussion pins are in such a position that when one cartridge is fired, the other cartridge is not fired by the recoil of the action body relatively to the inertia weight.

When the action body recoils relatively to the inertia weight 1, the projection 47 on the barrel body is moved into binding engagement with the bevelled end of the cover plate 46, and thus the breaking of the gun is prevented.

It will be seen that a simultaneous firing of both cartridges, due to involuntary pull, is furthermore prevented by the separation of the primary sears from the secondary sears, owing to the recoil.

The accumulator springs 8 store part of the energy of recoil and expend this energy in returning the action body to its normal position, the spring 43 acting as a buffer spring.

When the trigger has rocked the primary sear 60, the recess 69' is moved clear of the projection 69², and the rocking beam 71 is thereby allowed to be rocked in anticlockwise direction (see Figure 2) by the spring 76 so that the beak 67 is above the projection 65 on the primary sear 59. The trigger is thereby automatically moved into position to effect the firing of the second cartridge, the operation being similar to that described for the firing of the first cartridge.

When it is desired to break the gun to eject the spent cartridges, the hand lever 33 is rocked in an anticlockwise direction, the first movement of the lever 33 moves the safety catch 82 until the projection 83 thereon is in line with the recess 84 in the inertia weight 1, the projection 33' on the lever 33 and the projection 35 on the member 34 being at this moment moved into engagement with the abutments 36: further movement of the lever 33 causes the spindle 31 and with it the inertia weight 1, to be moved rearwardly, due to the engagement of the projections with the abutments 36 until finally the bevelled end of the cover plate 46 is moved clear of the ends of the barrels.

The bar 81, during the rearward movement of the inertia weight 1, is moved rearwardly, and the arm 80, fast with bar 81, causes the slide 77 to rock the rocking beam 71 in a clockwise direction (see Figure 2), thus effecting the cocking of the trigger.

Due to the engagement by the screws of the end of the slots 7 formed in the locking bolts 2, the bolts are moved rearwardly with the inertia weight and are thereby moved out of locking engagement with the barrel body. The barrels are then rocked about the virtual pivot 50', the cam surface 57 and the projection 58 slide the ejectors 55 relatively to the gun barrels.

When it is desired initially to cock the percussion pins 11, 12, the hand lever 33 is rocked in an anticlockwise direction, and the cam 30 fast with the spindle 31, to which the lever 33 is secured, moves the yoke member 28 rearwardly against the action of the spring 29, the projections 26, 27 engaging the ends of the recesses 24, 25 and sliding the percussion pins 11, 12 from the "uncocked" to the "cocked" position.

In order to decrease the length of the inertia weight 1, the ends of the springs 13, 14, provided for actuating the percussion pins 11, 12, may, as shown in Figure 21, be replaced by two springs 92, 97, which abut against shoulders formed on pins 98, 99, united at the ends by a plate 100.

We claim:

1. In a supporting rifle, gun or the like of the under-and-over type, the provision of locking bolts, an inertia weight slidably mounted thereon and carrying the percussion pins, the sears therefor and accumulator springs, the arrangement being such that relative movement between the percussion pins and the inertia weight, due to the recoil of the gun, automatically effects the cocking of the said pins, substantially as described.

2. In a sporting rifle, gun or the like, the provision of an inertia weight provided with means additional to the normal locking means for locking the barrel or barrels of the gun, the arrangement being such that on and during recoil the said additional locking means is moved into and maintained in effective locking position by the relative movement between the gun and the inertia weight.

3. An arrangement as claimed in claim 2, in which the additional locking means comprises a cover plate which is adapted to overlap the barrel or barrels during recoil of the gun, and is secured to the inertia weight, substantially as described.

4. A sporting rifle, gun or the like, including an arrangement, as in claim 2 in which the inner end of the barrel or barrels is provided with lugs in engagement with plates detachably secured to the action body of the gun, the plates serving to guide the barrel or barrels when moved into position from the drop-down position, substantially as described.

5. A sporting rifle, gun or the like, including an arrangement, as in claim 2 the provision of a spindle carried by the inertia weight, a hand lever fast with the spindle, a projection on the lever, and a fixed abutment on the action body adapted to be engaged by the projection, the arrangement being such that when the lever is rocked, the inertia weight, and the locking means carried thereby, are slidden relatively to the barrel or barrels, substantially as and for the purpose described.

6. In a double barrel sporting rifle, gun or the like as in claim 2, including, the provision of a single firing trigger mounted upon a rocking beam which is pivoted at its rear end, and two primary sears adapted alternately to be actuated by a spring urged beak mounted on the blade of the trigger, and adapted to actuate the secondary sears carried by the inertia weight, substantially as described.

7. An arrangement as claimed in claim 1, in which the primary sears are moved out of engagement with the secondary sears during, and by reason of, the recoil of the gun, substantially as and for the purpose described.

8. An arrangement as claimed in claim 1, in which the trigger, primary sears, and parts associated therewith, are formed as a unit detachably secured to the action body, substantially as and for the purpose described.

9. An arrangement as claimed in claim 1, in which, when the hand lever is rocked to slide the inertia weight relatively to the barrel or barrels, the trigger mechanism is automatically reset, substantially as described.

10. An automatic sear and sear operating mechanism as in claim 1 of a combination of percussion pins and ventral segments, by means of which the percussion pins are retracted approximately twice the distance that the action body moves relatively to the inertia weight, thereby introducing a differential motion betwixt the aforesaid ventral segments and percussion pins, substantially as and for the purpose described.

11. In a gun of the under-and-over type, the combination of an inertia member carrying percussion mechanism, sear and sear operating mechanism therefor, normal means for locking the barrels of the gun and locking means additional thereto, the cocking of the percussion mechanism and the actuation of the locking means being effected, due to the recoil of the gun relatively to the inertia weight, and a single trigger adapted alternately to actuate the sear and sear operating mechanism, substantially as described.

ARNOLD LOUIS CHEVALLIER.
ROBERT CHURCHILL.